US008419440B2

(12) United States Patent
Leahy

(10) Patent No.: US 8,419,440 B2
(45) Date of Patent: Apr. 16, 2013

(54) EDUCATIONAL OUTDOOR DISPLAY AND SYSTEM

(76) Inventor: Mark A. Leahy, Garner, NC (US)

( * ) Notice: Subject to any disclaimer, the term of this patent is extended or adjusted under 35 U.S.C. 154(b) by 434 days.

(21) Appl. No.: 12/542,221

(22) Filed: Aug. 17, 2009

(65) Prior Publication Data
US 2011/0039238 A1  Feb. 17, 2011

(51) Int. Cl.
G09B 29/00 (2006.01)

(52) U.S. Cl.
USPC .......................................................... 434/430

(58) Field of Classification Search .............. 434/81, 434/156, 167, 365, 402, 428, 430; 40/606.01, 40/606.15, 610, 611.01, 612, 617
See application file for complete search history.

(56) References Cited

U.S. PATENT DOCUMENTS

| 3,868,630 | A | * | 2/1975 | Lesondak | 340/908.1 |
| 3,999,764 | A | * | 12/1976 | Nitsche | 473/165 |
| 4,145,053 | A | * | 3/1979 | Healey | 473/169 |
| 4,157,831 | A | * | 6/1979 | Renn | 473/169 |
| 4,413,827 | A | * | 11/1983 | Aberg | 473/165 |
| RE32,359 | E | * | 2/1987 | Seely | 40/602 |
| 4,726,589 | A | * | 2/1988 | Grigas | 473/169 |
| 5,076,586 | A | * | 12/1991 | Taniguchi et al. | 473/169 |
| 5,095,642 | A | * | 3/1992 | George et al. | 40/610 |
| 5,203,566 | A | * | 4/1993 | Ricigliano | 473/158 |
| 5,220,740 | A | * | 6/1993 | Brault | 40/606.02 |
| 5,293,705 | A | | 3/1994 | Wood | |
| 5,395,115 | A | * | 3/1995 | Ferns et al. | 473/167 |
| 5,409,381 | A | | 4/1995 | Sundberg | |
| 5,419,561 | A | | 5/1995 | Weber | 473/409 |
| 5,438,782 | A | * | 8/1995 | Belobraydich et al. | 40/610 |
| 5,442,871 | A | * | 8/1995 | Sarkisian et al. | 40/606.17 |
| 5,964,052 | A | * | 10/1999 | Jepsen et al. | 40/607.1 |
| 5,987,794 | A | * | 11/1999 | Lavi et al. | 40/611.04 |
| 6,050,824 | A | | 4/2000 | Stuart | |
| 6,247,258 | B1 | * | 6/2001 | O'Malley | 40/606.02 |
| 6,718,671 | B1 | * | 4/2004 | Cluff | 40/611.03 |
| D498,541 | S | * | 11/2004 | Pettesch | D25/38 |
| 7,080,982 | B2 | | 7/2006 | Rawlins | |
| 7,651,404 | B1 | * | 1/2010 | Larson | 473/169 |
| 2005/0072892 | A1 | * | 4/2005 | Fell | 248/441.1 |
| 2009/0025265 | A1 | * | 1/2009 | Jedlicka | 40/610 |

* cited by examiner

Primary Examiner — Kurt Fernstrom

(57) ABSTRACT

The present invention relates to a system device and method for teaching an individual, such as a child, a series of educational items such as numbers or the alphabet. Each item is placed on a card and then each card placed in an upright card holder which has a wind tolerant base. There is one holder for each of the items in the educational series and a plurality of card holders in a wind tolerant stand are positioned around the yard for observation and thus, learning by the child.

13 Claims, 4 Drawing Sheets

EDUCATIONAL OUTDOOR DISPLAY AND SYSTEM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a device and method for teaching young children a series or plurality of educational themes. In particular, the present invention relates to a method and system whereby a plurality of educational pieces of information is designed for young children where each piece of information has its own independent outdoor stand.

2. Description of Related Art

It is well known that children and human beings, in general, learn via a multitude of senses and of means within those senses. The alphabet, numbers, animals and other series of items such as this are typically taught to young children from a book or displays around the classroom where the entire series is represented on a single indoor card or cards. Flash cards, for example, have long been used to teach series of items and flash cards for use anywhere have met with some success.

A number of different approaches have been used for displaying, teaching, reading and writing information or series. In U.S. Pat. No. 5,409,381 there is a display device having opaque portions and display portions. In U.S. Pat. No. 6,050,824 there is disclosed the representations of letters of the alphabet in a flip book. And in U.S. Pat. No. 7,080,982 there is disclosed a display media with a concealable portion for revealing a second indicia associated with a first indicia.

While many of these devices are usable if outdoors in a handheld manner, the ability to use them free standing nor their use outdoors is neither taught or suggested. It is always a benefit to find new ways for individuals, especially for a person at a young age, to learn series such as numbers and the alphabet in the most advantageous manner possible.

BRIEF SUMMARY OF THE INVENTION

The present invention relates to the discovery that if a series is placed in a weather, wind proof stand, they can be distributed around the play area for learning visually while children play outdoors. It has been discovered that this allows for more time learning critical series by young children and thus, either more quickly or better learn such series.

Accordingly, the present invention relates in one embodiment to a system for teaching a child a series of items outdoors comprising:
a) a plurality of cards, each card having an item of the series printed on one or more faces of each card;
b) a card holder for each of the plurality of cards, the holder designed to hold the card in an upright position; and
c) a base for holding each of the card holders in an upright position wherein the base is designed to free stand and be wind tolerant in an outdoor setting.

In another embodiment the present invention relates to a method of teaching a child a series of items comprising placing a sign of each item in the sign holder of the system and positioning each of the signs in their holder at various positions around an outdoor area.

In yet another embodiment of the invention there is a device for holding an educational card outdoors comprising a freestanding wind tolerant base and a card holder attached to the base in an upright manner sufficient to accept and display the educational card perpendicular to the ground.

DETAILED DESCRIPTION OF THE INVENTION

Figure 1:
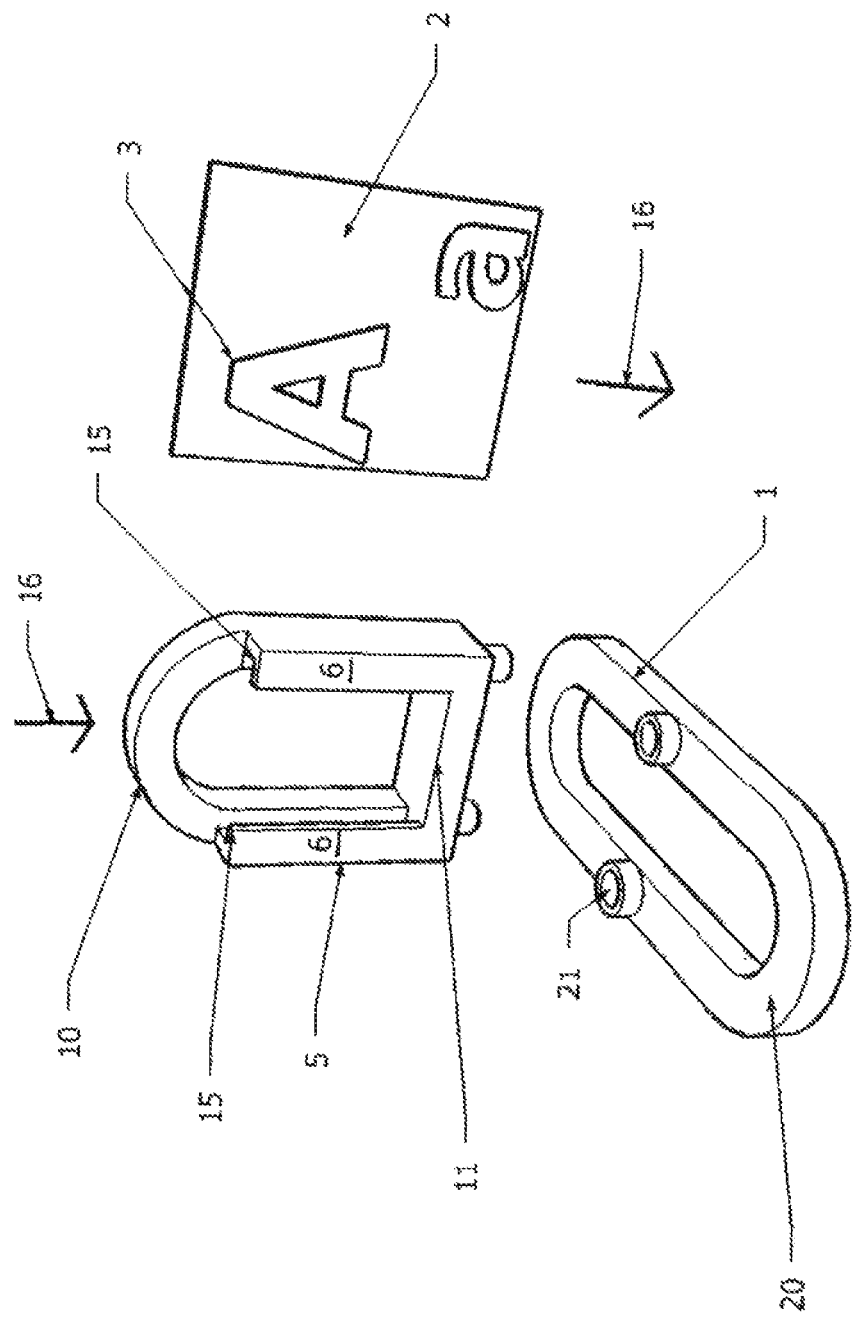
FIG. 1 is an exploded view of an embodiment of the invention having an oval base and a fixed sign holder.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "series of education items" refers to groups of items that one would like to teach a child or other human that have a relationship and an educational value. In all cases this is at least 2 but frequently can be a larger number depending on the size and number of members of the series. Examples of education series include but are not limited to the alphabet, letters, numbers, animals, math problems or equations, transportation objects (like cars boats etc.), cursive alphabet, words, photos and the like. Therefore, in one embodiment the series is 26 letters of the alphabet. The idea is that the series can be anything that collectively repetitive observation would help the individual such as a small child help remember due to repetitive observation. One skilled in the art can review the provided list and provide other series within the scope in view of the disclosure herein. The system of the invention provides device system and method for positioning the educational items in a series outdoors for observation.

As used herein "outdoors" refers to an intimate outdoor setting like a backyard, a park, a playground or the like where a child, or adult for that matter, would spend continuous time as opposed to along a road or other area where someone just passes by the outdoor area.

As used herein a "plurality of cards" refers to placing an item or portion of the total items of the series on each of the cards. Therefore, in one embodiment there are 26 cards with a single letter of the alphabet on each of the 26 cards. In another, each card displays both capital and small case letters. Since these cards are to be used outdoors they need to be of a size larger than a card would be if hand held. In general, they will be from about 6 inches across and large and in one embodiment they are from about 6 to about 18 inches across. They can be made of any suitable material such as cardboard, wood, plastic or the like. In one embodiment the cards are waterproof. In another embodiment they are printed on both sides with the same or different item of the series.

As used herein a "card holder" is a device for holding a single card of the series. The system will have one card holder for each card of the system. The card holder can be by any means as long as it holds the card in a readable upright position that is essentially perpendicular to the ground. In one embodiment of the invention the card holder holds the card in place by a slot and gravity, other embodiments include but are not limited to clips, frames, pressure devices, devices for hanging and the like. One skilled in the art can devise or will know other devices for holding a card. In one embodiment the cards can be replaced so that a different series of cards can be used with the device, for example, replacing the alphabet with the numbers 1 through 26 or the like. In some embodiments the card can be hung by the top so that the card may swing in the wind in the holder and thus, keep wind pressure at a minimum and prevent the device from falling over in the wind.

As used herein a "base for holding each of the card holders in an upright position" refers to a base that will be free standing (as opposed to stuck in the ground like a "for sale" sign) and hold the holder in a manner that it holds the card upright. In addition, since the system is used outdoors, the base needs to be wide enough to resist the effects of the wind (be wind tolerant) which can blow each device over or blow it away. In some embodiments the base could be oval, round, rectangular or the like. One skilled in the art in view of this disclosure could make a base wind tolerant. In one embodiment the base is at least about 6 inches across and in another, 12 inches across or larger. The length can be equal to or greater than the width of the base. It could also be weighted to achieve wind tolerance and in some embodiments it could be both. For example, a wide base could be hollow and allow for being filled with sand or the like. If the sand were refillable in the base they could be emptied for transport, or the like, and filled prior to use.

The system of the present invention is designed to be used outdoors. Accordingly, one embodiment of the present invention relates to constructing the stand to hold each card allowing the card to swing in the breeze. This allows the system to not be blown around as bad in high winds outdoors. The card can swing freely by itself or in other embodiments, it can swing via the card holder swinging free (as in the Figures for example). One way to allow either the card or the card holder to swing free is to have a dual pivot point at the top of the card or the holder. Uprights off of the base will allow there to be points where the card holder can swing free as in the example shown in the figures. The pivot arms on the holder fit into holes in the upright arms and thus, can swing freely in the wind as necessary.

The method of the present invention relates to teaching a child or other person a series of items comprising placing a card of each item in the system on a single card of the system and then placing each card in the system holder which can then freely stand on the ground outside. By then positioning the stands around the play yard, for example, placing 26 stands with each of the letters of the alphabet, the child playing in the yard is exposed to each of the different items of the series for learning them. Children's play is typically designated to the outside, while learning is typically an indoor activity. This invention will allow children an interactive way to learn outdoors, while at the same time getting exercise. This outdoor display can be incorporated into games that are traditionally played outdoors, i.e., "hide and seek", "mother may I", "red light green light" and the like. The present invention can thus incorporate learning into outdoor situations that have traditionally been thought of as strictly a play situation.

Lastly, the device itself is for the purpose of holding a single educational card and one embodiment comprises a cardholder for holding a card from about 6 inches to about 18 inches in size and a wind tolerant free standing base, the base of a dimension that resists being blown over by the wind, that is normal winds up to about 30 or 40 miles an hour. By creating a perimeter base that is from about a foot to about 3 feet across, the device will sit on a lawn or other outdoor area and not be easily blown over.

Now referring to the drawings. FIG. 1 is an exploded version of the present invention device. The system of the present invention comprises a plurality of the devices that each holds a single card. As shown in FIG. 1 there is a card 2 with an educational item, in this case a letter of the alphabet 3 shown in capital and small case. While not shown directly, the opposite side of card 2 can have nothing, the same or different item displayed. The cardholder 5 comprises uprights 6, top cross piece 10 and bottom cross piece 11. There is a slot 15 running on the inside of uprights 6 and on the inside of bottom crosspiece 11. The card 2 then is slid downward 16 and into slot 15 where it resides when the device is being used outside. The card holder 5 is placed on base 20 by placing uprights 6 into holes 21. In this embodiment the length of base 20 is about 2 to 3 times the length of the base, thus giving wind tolerance to the service when set on the ground.

Figure 2:
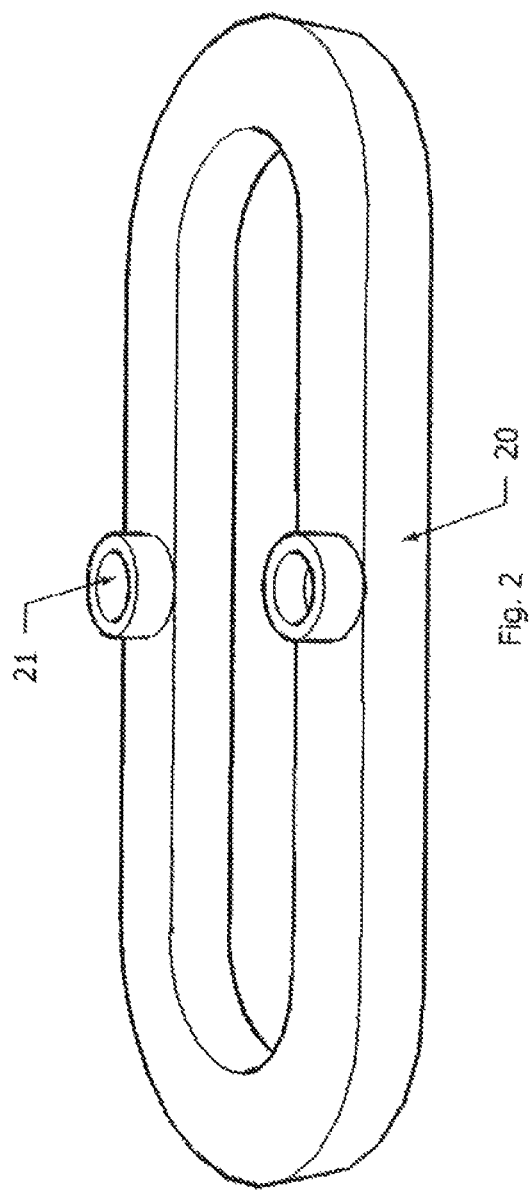
FIG. 2 is a perspective view of a wind tolerant base of the base shown in FIG. 1.

FIG. 2 is a perspective view of base 20. This view depicts in more detail the hole 21 that the uprights 6 of the device 1 in FIG. 1 use.

Figure 3:
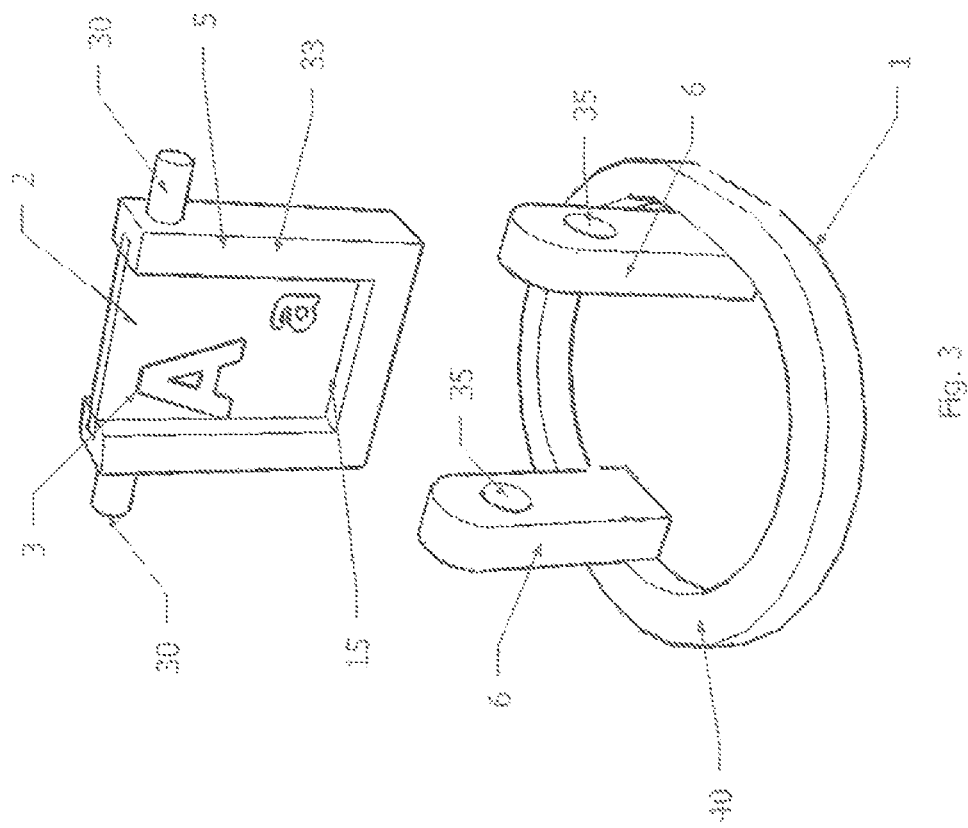
FIG. 3 is an alternate embodiment of the present invention having a circular base and a sign which can pivot or swing in the wind.

FIG. 3 is a perspective view of another embodiment of the invention. Device 1 is depicted again with a card 2 with letters 3 although these are depicted in 3-D relief in this embodiment. The card holder 33 is shown as separate from the uprights 6 of this embodiment. Once again the card 2 fits into slots 15 and is held in place by gravity. The cards can easily be removed and replaced with other cards.

In this embodiment the card holder 33 can swing freely in the breeze when used outdoors. In this exploded view, pivot knobs 30 are attached at the upper outer portions of the card holder. The pivot knobs 30 are then fit into upright hoes 35 in each of uprights 6. The arrangement of pivot knobs 30 in holes 35 allows for the card holder 33 to swing freely by the pivot points 33.

The base 40 of this invention is a circular wide base. The dimensions of this particular base are 12 inches in diameter and the total height of this embodiment is about 16 inches with the card being rectangular and of a dimension of about 9×11 inches. Clearly other shapes of card, card holder base and the like can be designed in view of the present disclosure.

Figure 4:
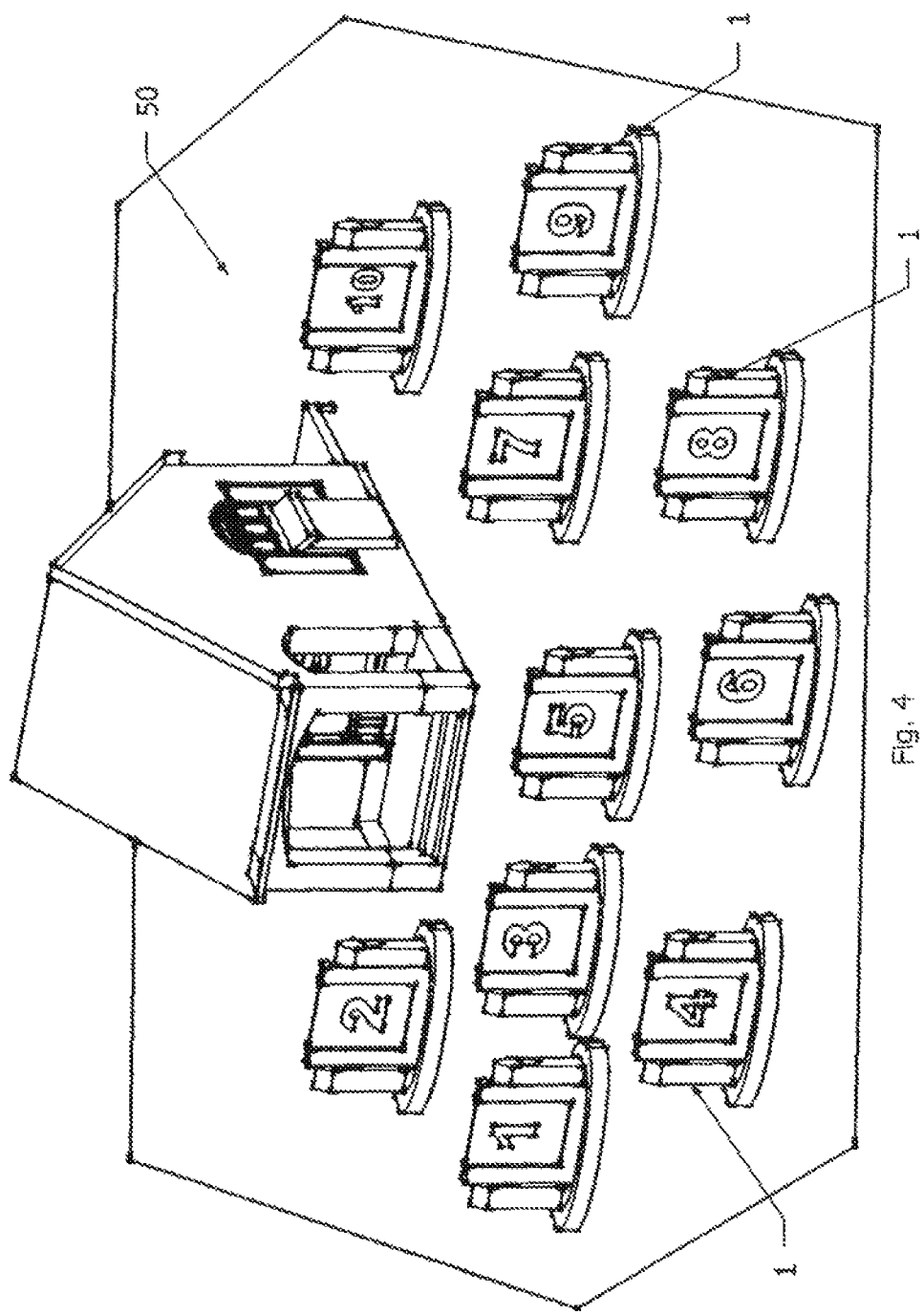
FIG. 4 shows a plurality of devices in a front yard setting for learning purposes.

FIG. 4 is a perspective view of a number of the devices 1 of the present invention placed in a yard 50. As can be seen ten devices are placed with the numbers 1 through 10 on them for educational use in learning the numbers. Note that no particular claim is made to the arrangement or placement of each of the devices in the outdoor area and as long as they are within sight of the child or individual they can easily be used.

The particular examples and drawings described herein are not intended to be limiting. Variations in educational information, placement of the devices in a yard or other outdoor setting, relative size, wind resistant bases and the like are within the skill in the art in view of the present disclosure. The claims which follow are to be so interpreted.

What is claimed is:

1. A system for teaching a series of educational items to a child outdoors comprising:
   a) a plurality of cards, each card having an item of the series printed on one or more faces of each card;
   b) a plurality of card holders each holder designed to hold a card in an upright position; and
   c) a plurality of bases each base designed to hold one of the card holders in an upright position wherein each base is designed to free stand and be wind tolerant in an outdoor setting and wherein all of the holders are positioned within sight of the child such that each of the cards can be read by the child at the same time from a single vantage point.

2. A system according to claim 1 wherein the cards are at least 6 inches across.

3. A system according to claim 1 wherein each base is wind tolerant by being wide enough to resist the wind.

4. A system according to claim 3 wherein each base is circular or oval.

5. A system according to claim 3 wherein each base is at least 12 inches across.

6. A system according to claim 3 wherein each base is wind tolerant by being weighted.

7. A system according to claim 1 wherein each card in the holder is able to swing in the wind.

8. A system according to claim 1 wherein each card is fixedly attached to the holder.

9. A system according to claim 1 wherein each card is free to swing in the wind separate from the holder.

10. A system according to claim 7 wherein each holder swings via a dual pivot point with a matching pair of uprights system.

11. A system according to claim 1 wherein the series comprises a series from a group consisting of numbers, letters, states, animals and math problems.

12. A system according to claim 1 comprising a plurality of circular or oval bases each base having a pair of uprights holding a sign holder attached to the uprights via a pivot arm.

13. A method of teaching a child a series of items comprising placing a card of each item in the system card holder of claim 1 and positioning each of the cards in the holder at various positions around an outdoor area wherein all of the holders are positioned within sight of the individual such that each of the cards can be read by the child at the same time from a single vantage point.

* * * * *